Patented June 17, 1941

2,245,619

UNITED STATES PATENT OFFICE 2,245,619

STYRENE POLYMERIZATION

John T. Stearn, Springfield, Pa., assignor to The United Gas Improvement Company, a corporation of Pennsylvania No Drawing. Application November 11, 1937, Serial No. 174,015

2 Claims. (Cl. 260—91)

This invention pertains generally to synthetic resins and pertains particularly to the polymerization of styrene.

The invention pertains more particularly to the production of a polymerization product from crude styrene that is adapted for molding and other uses to which synthetic resins are put.

Crude styrene may be obtained from the liquid products such as tar, drip oil and condensates resulting from the manufacture of city gas. The crude material may be separated by distillation, but it is extremely difficult, in view of the presence of materials of similar boiling point, such as xylene, to raise the concentration of styrene in a distillate beyond 55 or 60% with apparatus at present available. A styrene distillate thus obtained will be referred to as a light oil styrene fraction.

The polymerization of pure or substantially pure styrene may be accomplished merely by the application of heat with more or less satisfactory results.

However, in the case of a solution of styrene, say in toluene or benzene, below 75% and particularly below 60% in concentration, or in the case of a crude styrene obtained as a fraction in the distillation of the above mentioned liquid products, while polymers of styrene may be produced as the result of heating, these polymers are of such low molecular weight and viscosity that they are incapable of retaining a permanent shape upon molding, or of yielding hard films when used in lacquers or varnishes, and are therefore generally unsatisfactory for these purposes.

I have discovered that I can produce satisfactory polymerization products from crude styrene, or in general from styrene solutions 75% and less in concentration, and particularly when the concentration does not fall below 35%, by resorting to what might be termed a two-step process in that conditions are changed during the polymerization.

Generally speaking, during the first step a limited number of large molecules are formed and during the second step the intermediate product thus made is converted into a stable form.

First step

The first step may be accomplished as follows:
The first step may be accomplished by adding a relatively volatile solvent such as benzene to a light oil cut containing the styrene fraction, followed by distillation at atmospheric, subatmospheric or superatmospheric pressure to remove the added solvent.

Second step

The second step may follow the first step with or without the previous removal of a part or all of the xylene and other volatile material, for instance, by distillation under vacuum. For this intermediate distillation step, if employed, the pressure is reduced sufficiently to effect removal of the desired quantity of the solvent at the temperatures of distillation employed.

The second step may be accomplished as follows:

(1) By continuing to heat at a temperature between 80 and 120° C. for a long period of time and until all or at least a very large part of the material has reacted. Heating for several weeks at 100° C. may be taken as an example.

(2) By raising the temperature sufficiently to considerably speed up the reaction. For instance, the temperature may be raised to between 140 and 160° C. and as a specific example it may be raised to the boiling point of styrene at atmospheric pressure, namely, 146° C. This heating may be carried out in a closed system which prevents the escape of volatile matter and the time of heating is sufficient to complete or at least substantially complete the polymerization. If the more volatile material such as xylene had not been removed by an intermediate distillation step it may be removed by distillation after the reaction is complete provided a solvent-free polymer is desired. It is found that a superior product results when air is excluded from the reaction zone. This may be accomplished by washing with an inert gas such as nitrogen prior to the sealing of the system.

It appears that heating in a closed system may differ from heating in an open system with simultaneous distillation in the following respect, namely, that heating in a closed system is more likely to result in the production of small polymers whereas heating with concurrent distillation is more likely to increase the size of the existing polymers. Consequently, the result of using a closed system in the second step is more likely to result in plasticizing the polymer whereas heating with distillation should have the effect of increasing the average molecular weight.

The procedure of completely removing the solvent under vacuum to a relatively low temperature followed by heating at an elevated temperature, i. e., 140–160° C. produces a very markedly improved product as compared with conducting the entire polymerization reaction at the higher temperature range stated.

The first step relative to the formation of a limited number of reaction centers at a low temperature and the second step relative to the rapid polymerization of these centers may be combined in one operation by raising the temperature slowly at a predetermined rate with concurrent distillation of solvent and some unreacted styrene.

It is preferred to have the distillation proceed at a slow rate to cause at least the larger part of the styrene to polymerize rather than than vaporize. If desired, a reflux condenser may be employed to condense and reflux the vapors, particularly during the initial heating, to prevent or reduce the loss of styrene.

Another way of combining the first and second steps into one operation is to add an inhibitor to a cut of light oil containing the styrene fraction and follow this by heating.

The mechanism of the reaction is thought to follow that of the two-step process above described. At first, the inhibitor acts as such, and limits the number of reaction centers formed. As the heating continues, the inhibitor becomes less and less effective, permitting the unreacted material to add on to the previously formed reaction centers. As the heating continues further the inhibitor, either by decomposition or otherwise, becomes an accelerator and the result is that the building up of the size of the previously formed reaction centers is materially accelerated to cut down the total reaction time.

The heating may start at a low temperature such as between 80° and 120° C. with 100° C. as an example, and rise slowly or abruptly to the final temperature of between 140 and 160° C. with 146° C. as an example, or the final temperature may be applied throughout since it appears that a finite time interval is required for the inhibitor to lose its inhibiting action.

Pyrogallol, hydroquinone and alpha naphthol are examples of inhibitors that might be used.

I find that if a yellow colored light oil cut of the styrene fraction is heated in the absence of air the yellow color disappears. This does not take place if oxygen is present. This is described and claimed in my copending application Serial Number 174,013 filed Nov. 11, 1937.

Therefore, before polymerizing, I prefer to wash the air out of the sphere of reaction with an inert gas such as nitrogen and then polymerize in such an atmosphere to the exclusion of oxygen. The prior art, as far as I am aware, does not disclose the removal of color by this means.

The final product may be cleaned up, if necessary or desired, by precipitating the polymer from solution through the addition of methyl alcohol, acetone or chloroform. The solvent should be in sufficient amount so that two layers are formed, namely, if the solvent present is insufficient to form a double layer, enough benzene should be added to effect such a separation in the preferred form of the invention. It is possible, however, to effect a substantial purification of the polymer even though the polymer is obtained in the solid state.

A very large part of the material present other than polystyrene and including xylene and color bodies go into solution in the solvent layer, leaving the polystyrene layer in a purified state. I prefer to add sufficient benzene to cause the polystyrene layer to be fluid so that the layers may be separated by draining off the polystyrene layer through the bottom.

Upon removal of the polystyrene layer it may be subjected to distillation at any suitable pressure to remove benzene, xylene, and other materials dissolved therein, or it may be repeatedly washed with methyl alcohol to accomplish the same purpose, since the polystyrene is substantially insoluble in methyl alcohol.

The mixed solvent layer of alcohol and hydrocarbons may contain varying quantities of polystyrene depending upon the conditions under which the precipitation is conducted. The ratio of alcohol or acetone to hydrocarbon solvent may be so proportioned that the result solvent layer will contain little or no polystyrene, by the addition of a sufficient amount of methyl alcohol. The latter is the preferred procedure.

The constituents of the solvent layer may be recovered by fractional distillation.

The resinous product obtained in the above examples may be shaped, formed, molded, pressed, cast and otherwise processed by any of many methods and means known in the art.

It is adapted to the uses of synthetic resins generally. This includes not only the manufacture of shaped articles but also the manufacture of laminated glass, lacquers, paints, enamels, etc.

It is suitably adapted to the addition of fillers of all kinds, and to the addition of pigments, dyes and lakes.

For many industrial purposes a partially or incompletely polymerized styrene polymer may be useful. A specific instance of such use which may be mentioned is that wherein adhesion of a lacquer to metal is improved by completing the polymerization in situ.

Another instance of such use is as a plasticizing agent for molding to obtain a lower initial softening point and molding pressure with a final increase in melting point of the finished product coupled with a more permanent set of the molded article.

While the process is particularly adapted to the polymerization of styrene in solutions (which term includes light oil cuts) below approximately 75% and particularly below 60%, in concentration, it is to be understood that this is because of the deficiencies of known processes when applied to solutions of such concentrations, and that the process described herein is also adapted to the higher concentrations for which known processes are more or less suitably adapted.

To obtain a higher concentration of styrene in a light oil cut I may proceed as follows:

I add pure or substantially pure styrene to a light oil cut to bring the concentration of styrene up to at least 60% and preferably up to at least 75% or higher.

With mixtures of pure styrene in pure solvent a good resin may be produced by ordinary heat polymerization, if the styrene concentration is above 75%. A commercially usable product may possibly be made from such pure products by prior art methods with styrene concentrations as low as 60%.

In contrast to the foregoing, by the use of my two-step process it is possible to produce commercially satisfactory resins with styrene concentrations as low as 35% of pure styrene in pure xylene.

While it is more difficult to produce a satisfactory resin from corresponding styrene concentrations in the crude solvents present in light oil concentrates, and while the concentration necessary to produce a satisfactory resin is found to vary with the source of the material employed, nevertheless satisfactory resins may be produced with concentrations much lower than is possible by prior art methods.

It is assumed that the behavior of the crude styrene concentrates from light oil as compared with synthetic mixtures of pure styrene as above outlined is due to the presence of interfering impurities. One benefit obtained from the addition of pure styrene to crude styrene is a reduction in the concentration of these interfering impurities.

It is to be understood that the above particular description is by way of illustration and that changes, omissions, additions, substitutions and/or modifications might be made within the scope of the claims without departing from the spirit of the invention which is intended to be limited only as required by the prior art.

I claim:

1. A process for polymerizing styrene in a light oil styrene fraction comprising materials of similar boiling points of which at least 35% is styrene by a plurality of steps comprising (a) adding thereto a relatively volatile solvent for styrene; (b) distilling the resulting mixture to remove the added solvent, thereby simultaneously initiating polymerization of styrene in said mixture; and after removal of said added solvent (c) substantially completing the polymerization of the styrene by the application of heat.

2. A process for polymerizing styrene in a light oil styrene fraction comprising materials of similar boiling points of which from 35% to 60% is styrene by a plurality of steps comprising (a) adding benzene thereto; (b) distilling the resulting mixture to remove the added benzene, thereby initiating polymerization of styrene in said mixture; and after removal of added benzene (c) substantially completing the polymerization of the styrene by the application of heat.

JOHN T. STEARN.